Figure 1:
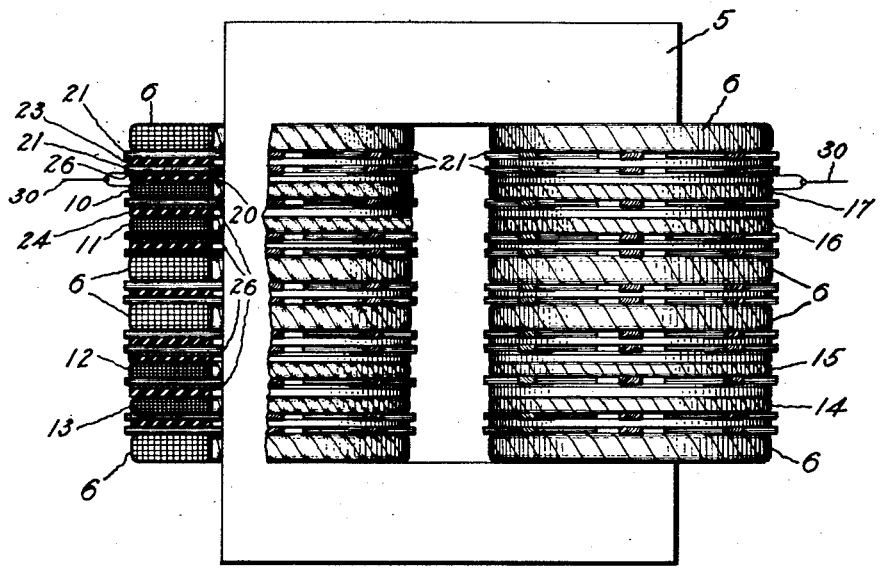

F. C. GREEN, DEC'D.
B. M. GREEN, ADMINISTRATRIX.
PROTECTIVE MEANS FOR ELECTRICAL APPARATUS.
APPLICATION FILED DEC. 4, 1916.

1,275,151.

Patented Aug. 6, 1918.

Inventor:
Frank C. Green, Deceased,
Bessie M. Green, Administratrix,
by
Attorney.

UNITED STATES PATENT OFFICE.

FRANK C. GREEN, DECEASED, LATE OF PITTSFIELD, MASSACHUSETTS, BY BESSIE M. GREEN, ADMINISTRATRIX, OF PITTSFIELD, MASSACHUSETTS, ASSIGNOR TO GENERAL ELECTRIC COMPANY, A CORPORATION OF NEW YORK.

PROTECTIVE MEANS FOR ELECTRICAL APPARATUS.

1,275,151.      Specification of Letters Patent.      Patented Aug. 6, 1918.

Application filed December 4, 1916. Serial No. 135,097.

*To all whom it may concern:*

Be it known that FRANK C. GREEN, deceased, late a citizen of the United States and a resident of Pittsfield, in the county of Berkshire, State of Massachusetts, during his lifetime invented certain new and useful Improvements in Protective Means for Electrical Apparatus, and that I, BESSIE M. GREEN, duly appointed administratrix of the said FRANK C. GREEN, do hereby declare, to the best of my knowledge and belief, that the following specification, taken in connection with the accompanying drawings, is a clear, true, and complete description of said improvements.

This invention relates to electrical apparatus, particularly high voltage transformers, and especially to the windings thereof.

It has been recognized that unduly high frequency electrical phenomena, including under that term (for the purposes of this case) true high frequency phenomena, surges, particularly those surges of steep wave fronts, and similar abnormal manifestations, are likely to result in disastrous strains on the windings of apparatus subject thereto. Transformers are particularly subject to such phenomena on account of their size and since they are commonly connected directly to transmission lines.

An object of the present invention is to provide for the protection of such apparatus against such phenomena. This is done by providing closed electrically conducting turns inductively related to the windings. These turns may serve their purpose in various ways: First, acting as secondary windings, they may absorb high frequency energy impressed on the windings to which they are inductively related, by changing into heat the electrical energy induced in them by the high frequency currents traversing the winding they are to protect. Second, they may lower the inductive resistance of the adjacent winding to high frequency energy by offering something like short circuits about the high frequency fluxes of the winding. Third, they may reduce the magnetic leakage between parts of the winding under high frequencies, and thus reduce the possible differences of potential between different parts of the same winding when subject to high frequency phenomena. Particularly in order to act in the two latter ways, the protective turns should be fairly numerous and fairly thoroughly distributed throughout the winding; it is also desirable that the turns be numerous, and distributed throughout the windings in so far as they act as high frequency absorbers, in order that there may be considerable absorptive capacity and also that there may be absorptive turns adjacent the source of any high frequency disturbance that may be developed within the windings themselves. But even if its application is more limited some of the advantages of the invention may be obtained; for example, considerable advantages of this invention may be obtained by absorbing turns located only adjacent the terminals of the windings and hence accessible to disturbances from the outside, where disturbances most commonly originate.

To serve their purpose the closed turns may be related in various ways to the winding they are to protect. Preferably, for example, that they may function in all the ways enumerated above, the protective turns have the same winding axis as the winding they protect. So located they preferably offer considerable ohmic resistance to the passage of current about themselves in order to limit the normal frequency losses therein during normal operation of the apparatus, or in order that the maximum high frequency energy may be absorbed therein since there generally occurs some high frequency magnetic flux leakage between the protection turns and their winding; the value of the resistance may, of course, be determined from a consideration of both of these factors. So located also the turns tend to decrease the inductive resistance of the adjacent winding to high frequency energy, and to establish magnetomotive forces counter to leakage magnetomotive forces of different parts of the winding tending to establish leakage magnetic fluxes respectively linking other parts of the winding. When the windings comprise disk coils, the closed turns preferably comprise each an annular plate between coils and a resistance closing the circuit through the plate about the winding axis.

Figure 2:
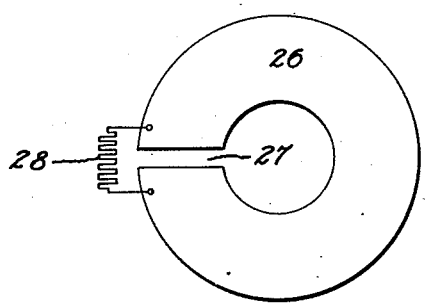

In the accompanying drawing and the following detailed description a preferred embodiment of this invention is illustrated and described. Figure 1 illustrates in elevation a core type disk coil transformer embodying the invention, one of the coil stacks being partially in section. Fig. 2 is a plan view of one of the protective turns of the transformer of Fig. 1.

The core 5 of the transformer of Fig. 1 is of a usual rectangular shape; the windings being carried on the two legs thereof. The windings of the transformer comprise interleaved disk coils. The coils 6 form the low voltage windings; the connections between these coils are immaterial and not illustrated. The high voltage windings comprise the disk coils 10, 11, 12, 13, 14, 15, 16, and 17. Coils 10—13, together with four of the low voltage coils 6, comprise the windings on one leg of the core 5, and the coils 14—17 together with the remaining four coils 6 comprise the winding on the opposite leg of the core 5. The coils of these windings are insulated from each other in a common manner. Between the coil 10 and the low voltage coil 6 immediately above it, occur the following insulating material in order: an annulus 20 of insulating material, radially disposed spacers 21, another annulus 23, and another group of radial spacers 21; on this second group of radial spacers 21 lies the low voltage coil 6. The coil 10 is insulated from the coil 11 by the annulus 24 and radial spacers. The insulation of the remaining coils is quite similar in principle but differs in detail in some instances as appears from the drawing. The exact scheme of insulation of the coils is immaterial to the present invention and it need be no further described. Between the insulating annulus 20 and the first mentioned group of radial spacers 21 is located the permanently closed turn or shield 26 about the winding axis of the adjacent coil 10. This closed turn or shield is more completely illustrated in Fig. 2. It will be observed from Figs. 1 and 2 that this turn comprises a circular metallic plate of about the same internal and external diameters as the coil 10, the plate being provided with a radial opening 27, and the circuit about the shield and across the opening 27 being completed by a resistance member 28. Similar shields are disposed between the coils 10 and 11, immediately below the coil 11, between the coil 12 and the low voltage coil 6 immediately above it, and between the coils 12 and 13; similar shields are disposed and distributed throughout the coil stack at the right of Fig. 1 in a similar manner. The coils 10 and 17 are the terminal coils of the high voltage windings and each of the protective turns or shields 26 immediately above these two coils and adjacent their terminal faces may be connected to the adjacent terminal 30 of the windings, as shown in the drawing. The high voltage coils may be considered connected in series between the terminals 30.

As before indicated the protective turns or shields 26 serve to protect the windings by acting in various ways. They surround the same winding axes as the windings they protect and being closed turns about these axes have currents induced within themselves. These currents of necessity traverse the resistances 28, electrical energy being absorbed therein by being converted into heat. These resistances 28 have sufficiently great values to limit the losses therein at normal frequencies and under normal operating conditions. The losses in the protective turns under normal operating conditions may be limited in this manner while the losses therein may amount to appreciable values during the occurrence of high frequency energy within the high voltage windings due to the increased number of volts per turn (and hence increased current and losses in the protective turn 26) under high frequencies. These protective turns also tend to lower the inductive resistance of the windings to high frequency energy since they are in a measure short circuited secondary turns distributed throughout the windings, and as such tend to reduce the inductance thereof particularly at high frequencies when they convey greater values of current. Furthermore, they are so disposed as to interlink with the high frequency leakage fluxes as well as the fluxes that follow the core. By reason of thus interlinking with the high frequency leakage flux they not only tend to decrease the inductance of the windings under high frequencies but they also tend to produce magnetomotive forces counter to the magnetomotive forces tending to produce leakage magnetic fluxes linking individual parts of the windings, and thereby to reduce the differences of potential experienced between different parts of the same winding when that winding is subject to high frequency phenomena. These phenomena may be better understood by referring to the drawing. Thus leakage fluxes, for example, may leave the left hand leg of the core between coils 11 and 12, passing into the right hand leg of the core between the coils 15 and 16, and completing its path through the upper yoke of the core 5; other leakage flux may leave the left hand leg of the core likewise between the coil 11 and 12, enter the right hand leg between the coils 15 and 16 and complete its path through the lower yoke of the core 5. Without the protective turns 26, such action under high frequencies might occur and result in electromotive forces in coils 11 and 12 substantially 180 degrees out of phase and consequently a very unduly high voltage difference between these coils. The protective turns 26 restrain and limit these leakage fluxes linking individual parts of the winding, for they interlink with any such leakage flux, and hence, by reason of the currents induced therein establish a magnetomotive force counter to the magnetomotive force producing this leakage flux and as a result reduce the possible difference of potential between the coils 11 and 12, and between coils 15 and 16.

While the principle of this invention and the best mode contemplated for applying the same are described, other modifications will occur to those skilled in this art, and it is aimed in the appended claims to cover all modifications which do not involve a departure from the spirit and scope of this invention.

What is claimed as new and desired to secure by Letters Patent of the United States, is:—

1. The combination with an electrical winding, of means for protecting the same against the effects of high frequency energy comprising a plurality of separate permanently closed turns about the same winding axis as the winding and respectively localized adjacent and permanently inductively related to different portions of the winding.

2. The combination with an electrical winding, of means for protecting the same against the effects of high frequency energy comprising a plurality of separate permanently closed turns distributed along said winding and respectively localized adjacent and permanently inductively related to different portions of the winding.

3. An electrical winding comprising a plurality of coils about a common axis, and a plurality of closed turns between the coils and about the same axis.

4. An electrical winding comprising a plurality of coils, a conducting turn disposed between those coils and a resistance closing said turn.

5. An electrical winding comprising a plurality of coils, a plurality of turns distributed throughout the winding between coils thereof, and resistances completing the circuits of said turns.

6. An electrical winding comprising a plurality of coils, and a closed conducting turn having appreciable ohmic resistance disposed between those coils.

7. A tran former comprising a primary winding, a secondary winding inductively related thereto, and a plurality of separate permanently closed turns distributed along and permanently inductively related to one of said windings for protecting the transformer against high frequency energy, said turns establishing magnetomotive forces counter to the leakage magnetomotive forces of parts of the winding tending respectively to establish a plurality of magnetic fluxes linking individual parts of the winding.

8. A transformer comprising a primary winding, a secondary winding inductively related thereto, and a plurality of separate means distributed throughout one of said windings for establishing magnetomotive forces respectively counter to the leakage magnetomotive forces of different parts of said winding.

9. A transformer comprising a primary winding, a secondary winding inductively related thereto, and a closed turn possessing considerable ohmic resistance inductively related to one of said windings near a terminal thereof.

10. A transformer comprising a primary winding, a secondary winding, one of said windings in turn comprising a plurality of disk coils, and a complete turn possessing appreciable ohmic resistance disposed between said coils and about the same winding axis.

11. A transformer comprising a primary winding, a secondary winding inductively related thereto, and a closed turn possessing considerable ohmic resistance inductively related to one of said windings.

12. A transformer comprising a primary winding, a secondary winding, one of said windings in turn comprising a plurality of disk coils, a shield of about the same internal and external diameters as said coils disposed between said coils, and a resistance completing the circuit of said shield about the same winding axis as said coils.

13. A transformer comprising a primary winding, a secondary winding inductively related thereto, one of said windings in turn comprising a plurality of disk coils disposed about a single axis, metallic plates each substantially surrounding said axis between and parallel to said coils, similar plates similarly located adjacent the outer faces of the terminal coils of the disk coil winding, and resistance closing the electrical circuits of said plates.

14. An electrical winding and means for protecting the same against the effects of high frequency energy comprising a shield of about the same internal and external diameters as said winding located adjacent a terminal face of said winding and connected to the adjacent winding terminal, and a resistance completing the circuit of said shield.

15. A transformer comprising a primary winding, a secondary winding inductively related thereto, and a plurality of separate permanently closed turns distributed along and permanently inductively related to one of said windings for protecting the transformer against high frequency energy.

In witness whereof, I have hereunto set my hand this 14th day of November, 1916.

BESSIE M. GREEN,
*Administratrix of the estate of Frank C. Green, deceased.*